United States Patent [19]

Miller et al.

[11] 4,379,885

[45] Apr. 12, 1983

[54] FLUOROCARBON COATING COMPOSITIONS

[75] Inventors: John D. Miller, Springdale, Pa.; Valentine J. Grunewalder, Bayville, N.J.

[73] Assignee: PPG Industries, Inc., Pittsburgh, Pa.

[21] Appl. No.: 220,679

[22] Filed: Dec. 29, 1980

[51] Int. Cl.³ .............................................. C08L 63/00
[52] U.S. Cl. .................................... 525/108; 523/435; 523/437
[58] Field of Search .......................................... 525/108

[56] References Cited

U.S. PATENT DOCUMENTS

| 3,108,088 | 10/1963 | Krueger | 525/108 |
| 3,442,976 | 5/1969 | Gerek | 525/108 |
| 4,297,447 | 10/1981 | Yasuda | 525/111 |
| 4,314,004 | 2/1982 | Stoneberg | 428/416 |

FOREIGN PATENT DOCUMENTS

| 54-101847 | 8/1979 | Japan | 525/108 |
| 1049088 | 11/1966 | United Kingdom | 525/108 |

Primary Examiner—Paul Lieberman
Attorney, Agent, or Firm—Charles R. Wilson

[57] ABSTRACT

Coating compositions especially useful as primers for metal substrates consist essentially of polyepoxide resin, acrylic resin and fluorocarbon resin.

6 Claims, No Drawings

FLUOROCARBON COATING COMPOSITIONS

The subject invention relates to coating compositions. More particularly the invention relates to compositions especially useful as primers on metal substrates.

Quite often substrates to be given a coating are first primed with a composition so as to improve the adhesion of the topcoat to the substrate and, in certain instances, to improve the corrosion resistance of the substrate. This is particularly necessary with metal substrates such as steel and aluminum. That is, topcoatings which are able to provide a durable and aesthetic appearance to the substrate usually do not have the ability to adhere well to the substrate itself or protect the substrate from corrosion. For this reason many different primer coating compositions have been formulated. Such compositions must have the ability to adhere well to the substrate protect the substrate from corrosion, and provide good adhesion to the topcoating. Additionally, the primer must itself retain its integrity, i.e. not craze or deteriorate.

The composition of the primer is dictated by the substrate to which it is to be applied and by the topcoat which will subsequently be applied to it. One area in particular where primer coating compositions are especially needed are in building panels and other articles made from extruded and sheet metal which are intended for outdoor use. Such substrates very readily become corroded without the proper coating protection. In recent years, coatings based on fluorocarbon resins have been widely used to provide a durable coating to metal. The durability of the fluorocarbon resins is evident by its tough finish as well as its ability to provide a finish which will not craze or chalk with the changing weather conditions. While the fluorocarbon resin based compositions provide a very satisfactory topcoating, the resins themselves adhere very poorly to metal substrates and have less than satisfactory corrosion resistance. Accordingly, a primer coating composition which is capable of adhering well to a metal substrate as well as having good intercoat adhesion with the fluorocarbon based topcoat is needed. Such compositions ideally also provide good corrosion resistance to the substrate.

As used herein all percentages and ratios are by weight unless otherwise indicated.

SUMMARY OF THE INVENTION

Coating compositions of this invention consist essentially of, on a resin solids basis, (a) from about 3% to about 20% of a polyepoxide resin (b) from about 30% to about 96% of an acrylic resin and (c) from about 1% to about 50% of a fluorocarbon resin. The coating compositions are especially useful for priming metal substrates.

DETAILED DESCRIPTION OF THE INVENTION

The invention relates to coating compositions. The essential components of the composition are polyepoxide resin, acrylic resin and fluorocarbon resin. Further details as to the individual components of the compositions as well as methods of applying the compositions to substrates are found in the following paragraphs.

The compositions of this invention consist essentially of, on a resins solids basis, from about 3% to about 20% of a polyepoxide resin, from about 30% to about 96% of an acrylic resin and from about 1% to about 50% of a fluorocarbon resin. The above levels of resins are necessary in primer coating compositions to get the desired degrees of substrate and topcoat adhesion and corrosion resistance. For instance, lower levels of fluorocarbon resins have an adverse effect on intercoat adhesion to the topcoat, while higher levels of fluorocarbon resins have an adverse effect on the corrosion resistance provided to the substrate by the primer coating composition. The resin solids of the compositions can vary widely but typically range from about 15% to about 35%, preferably from about 20% to about 30% with the balance being organic solvents and conventional additives. One preferred composition of the invention which is especially useful where good corrosion resistance is needed consists essentially of, on a resin solids basis, from about 8% to about 12% of the polyepoxide resin, from about 76% to about 84% of the acrylic resin and from about 8% to about 12% of the fluorocarbon resin. Another preferred composition which is especially useful where good intercoat adhesion and delamination resistance is needed consists essentially of, on a resins solids basis, from about 10% to about 15% of the polyepoxide resin, from about 30% to about 45% of the acrylic resin and from about 40% to about 55% of the fluorocarbon resin.

The polyepoxide forming a part of the coating compositions is any compound or mixture of compounds having a plurality of 1,2-epoxy groups, i.e. any compound having a 1,2-epoxy equivalency greater than 1.0. The preferred polyepoxides have a molecular weight of from about 150 to about 5,000. Examples of these polyepoxides are described in *Handbook of Epoxy Resins,* Lee and Neville, 1967, McGraw-Hill Book Company, the disclosure of which is herein incorporated by reference.

A preferred class of polyepoxides are the polyglycidyl ethers of polyphenols. These are produced by etherification of a polyphenol with epichlorohydrin in the presence of an alkali. The phenols which can be used include 2,2-bis(4-hydroxyphenyl)propane: 1,1-bis (4-hydroxytertiarbutylphenyl)ethane: 1,1-bis(4-hydroxyphenyl)isobutane: 2,2-bis(4-hydroxytertiarybutylphenyl)propane: bis(2-hydroxynaphthyl) methane: 1,5-dihydroxynaphthalene: and 1,1-bis-(4-hydroxy-3-allylphenyl) ethane.

Also suitable are the similar polyglycidyl ethers of polyhydric alcohols which are derived from polyhydric alcohols such as ethylene glycol, diethylene glycol, triethylene glycol, 1,2-propylene glycol, 1,4-butylene glycol, 1,5-pentanediol, 1,2,6-hexanetriol, glycerol, and 2,2-bis(4-hydroxycyclohexyl)propane.

Cycloaliphatic epoxy resins are also useful herein. These resins are prepared by epoxidation of unsaturated cyclic alkenes with organic peracids, e.g. peracetic acid.

The acrylic resins used in this invention are thermoplastic or thermosetting in nature. The thermoplastic acrylic resins are the polymerized ester derivatives of acrylic acid and methacrylic acid. The esters are formed by the reaction of the acrylic or methacrylic acid with a suitable alcohol, e.g. methyl alcohol, ethyl alcohol, propyl alcohol, butyl alcohol, and 2-ethylhexyl alcohol. Monomers such as styrene, vinyl toluene, vinyl chloride, and vinylidene chloride can be reacted with the acrylic and methacrylic esters so as to produce resins with modified properties. An especially satisfactory resin is a copolymer of methyl methacrylate and ethyl acrylate having a molecular weight of between about 50,000 and about 150,000. Thermosetting acrylic resins which can also be used herein are normally low molecular weight copolymers made from two or more monomers. Many such resins are known and can be used here. One of the monomers is an acrylic or methacrylic compound containing pendant reactant groups such as hydroxyl or amide. Another is an acrylic acid or methacrylic acid. Other monomers usually used include a styrene-type monomer such as styrene itself, vinyl toluene, methyl styrene or ethyl styrene, acrylonitriles and N-alkoxy methacrylates. The proportions of the monomers in the polymerization procedure are varied depending on the properties desired.

Several different fluorocarbon resins are used in conjunction with the aforedescribed polyepoxide resins and acrylic resins. Such resins include the polyvinyl fluorides, the polyvinylidene fluorides, vinyl fluoride copolymers and vinylidene fluoride copolymers. These resins are described in more detail in U.S. Pat. Nos. 2,419,010; 2,510,783; 2,435,537; 2,935,818; 2,468,054; and 2,970,988 (the disclosures of these patents are herein incorporated by reference). The preferred fluorocarbon resin is a polyvinylidene fluoride.

Suitable solvents useful as a carrier for the aforementioned resins include the aromatic petroleum distillates such as toluene and xylene, cyclohexane, methyl ethyl ketone, methyl isobutyl ketone, alcohols such as ethyl alcohol, propyl alcohol, and diacetone alcohol, dimethyl phthalate and mono- and dialkyl ethers of ethylene and diethylene glycol, such as ethylene glycol monoethyl ether, ethylene glycol monobutyl ether, ethyelene glycol monoethyl ether acetate, diethylene glycol monobutyl ether and diethylene glycol diethyl ether.

The compositions aforedescribed can be applied to a substrate as is. Preferably, however, the compositions are pigmented for the purpose of improving even further the corrosion resistance and intercoat adhesion of the compositions. The compositions contain a pigment at a pigment volume concentration (PVC) of from about 3% to abut 55%. Several different pigments can be used. Inorganic pigments which are useful include titanium dioxide, silica, iron oxides, talc, mica, clay, zinc oxide, zinc sulphide, zirconium oxide, carbon black, lead chromate, molybdate orange, calcium carbonate, calcium phosphosilicate composites, and barium sulfate. Organic pigments can also be used. Suprisingly, it has been found pigment settling during storage and just prior to application of the compositions of this invention is much improved over conventional primer compositions not containing fluorocarbon resin. This is beneficial to a minor extent with respect to packaged compositions in that it allows for easy redispersion of the pigments without a need for extensive stirring of the composition. However, it is most beneficial with respect to the problem of pigment settling which occurs when the compositions are thinned for spraying and then allowed to sit. The pigments which settle under these conditions are very difficult to redisperse. Inclusion of the fluorocarbon resin in the compositions alleviates this problem.

Conventional additives are also included in the coating compositions at minor levels. Thus, surfactants, antioxidants, ultraviolet light absorbers, stabilizers, lubricants, coalescing agents and suspension agents are added as needed.

The compositions are particularly useful as a primer on metals, especially aluminum because of the compositions' excellent adhesion and corrosion resistance they impart thereto. Other substrates such as plastic, wood, masonry, wallboard, leather and fabrics can also be coated with the compositions of this invention. The substrates to be coated are usually fabricated to their desired shape prior to the coating steps; however, because of the excellent flexibility of the coating compositions, it is possible to coat the substrate and then fabricate the desired coated article.

The substrates are coated with the compositions by any of several suitable coating methods, including spraying, roll coating, flow coating, brushing, dipping, etc. Generally, the applied coating composition is dried prior to any topcoating operation. Topcoats containing a substantial amount of fluorocarbon resin as a film-former are particularly useful in conjunction with the primer compositions of this invention. Such topcoat compositions have very good intercoat adhesion with the primer compositions.

EXAMPLE I

A primer coating composition of this invention has the following formulation:

|  | Parts by weight | % of Resin Solids |
|---|---|---|
| Thermoplastic acrylic resin dispersion (40% solids) (1) | 7 | 1.1 |
| Fluorocarbon resin (2) | 24 | 9.2 |
| Thermosetting acrylic resin dispersion (50% solids) (3) | 411 | 78.8 |
| Polyepoxide resin solution (75% solids) (4) | 38 | 10.9 |
| Dimethyl phthalate | 6 |  |
| Ethylene glycol monobutyl ether | 7 |  |
| Ethylene glycol monoethyl ether acetate | 9 |  |
| Xylene | 8 |  |
| Aromatic petroleum solvent (5) | 68 |  |
| Diacetone alcohol | 161 |  |
| Bentonite clay | 4 |  |
| Ethyl alcohol | 1 |  |
| Strontium chromate | 36 |  |
| Titanium dioxide | 88 |  |
| Barium sulfate | 152 |  |
| Diethylene glycol monobutyl ether | 8 |  |

(1) Methyl methacrylate - ethyl acrylate copolymer dispersion available from Rohm & Haas Co. as Acryloid B-44.
(2) Polyvinylidene fluoride resin available from Pennwalt Corp. as Kynar 500.
(3) Interpolymer of ethyl acrylate/methacrylonitrile/methacrylic acid/acrylamide, 72.5/20/2.5/5.0.
(4) Available from Shell Chemical Co. as EPON 1001.
(5) Available from Humble Oil & Refining Co. as Solvesso 100.

Chromate pretreated aluminum building panels are primed with the above composition by mixing two parts of the composition with one part toluene by volume and spraying the blend onto the panels. The coating is flashed for 10 minutes at ambient temperature and then the coated substrates are run through an oven to achieve a peak metal temperature of 175° C. The film, having 0.25 mil dry film thickness, has good adhesion to the substrate.

A pigmented composition is formulated as below for use as a topcoat to the above described primer coating composition.

|  | Parts by Weight |
|---|---|
| Fluorocarbon resin (1) | 212 |
| Thermoplastic resin dispersion (40% solids) (1) | 227 |
| Ethylene glycol monoethyl ether acetate | 104 |
| Dimethyl phthalate | 77 |
| Xylene | 111 |
| Bentonite clay | 3 |
| Ethyl alcohol | 1 |
| Toluene | 17 |

-continued

| | Parts by Weight |
|---|---|
| Ethylene glycol monobutyl ether | 103 |
| Aluminum paste (65% solids) | 54 |

(1) As used in the primer coating composition.

The above pigmented coating composition is reduced 2.5 parts to 1 part methyl ethyl ketone and 0.04 parts diethylene glycol monobutyl ether by volume. A 1.0 mil dry film thickness coating is applied to the primed panels by spraying the pigmented composition onto the panels, flashing for 10 minutes and baking at 240° C. for 10 minutes. The final coated panel has excellent appearance and excellent durability. Adhesion of the coatings to one another is very good as measured by a knife adhesion test. Adhesion of the primer coat to the substrate is also very good when tested using a standard cross-hatch test. Corrosion resistance imparted to the substrate by the coatings is satisfactory.

EXAMPLE II

Another useful primer coating composition contains the following:

| | Parts by Weight | % of Resin Solids |
|---|---|---|
| Thermoset acrylic resin dispersion (45% solids) (1) | 400 | 78.2 |
| Fluorocarbon resin (2) | 23 | 10.0 |
| Thermoplastic acrylic resin dispersion (40% solids) (2) | 6 | 1.0 |
| Polyepoxide resin solution (75% solids) (2) | 33 | 10.8 |
| Toluene | 53 | |
| Bentonite clay | 3 | |
| Ethyl alcohol | 1 | |
| Ethylene glycol monobutyl ether | 68 | |
| Calcium phospho silicate composite (3) | 31 | |
| Titanium dioxide | 76 | |
| Barium sulfate | 131 | |
| Methyl ethyl ketone | 96 | |
| Isobutyl alcohol | 44 | |
| Dimethyl phthalate | 6 | |
| Ethylene glycol monoethyl ether acetate | 9 | |
| Xylene | 7 | |

(1) Methacrylic acid/methyl methacrylate/N—butoxy methacrylate/butyl acrylate resin, 2.4/70.0/10.4/17.2.
(2) As used in Example I.
(3) Available from Mammond Co. as Halox WH.

When applied in the manner set out in Example I, a good adherent coating is obtained.

EXAMPLE III

Another primer coating composition having especially good intercoat adhesion and delamination resistance is formulated as follows:

| | Parts by Weight | % of Resin Solids |
|---|---|---|
| Thermoplastic acrylic resin dispersion (40% solids) (1) | 279 | 38.1 |
| Fluorocarbon resin (1) | 147 | 50.0 |
| Polyepoxide resin solution (75% solids) (1) | 47 | 11.9 |
| Strontium chromate | 44 | |
| Titanium dioxide | 108 | |
| Barium sulfate | 187 | |
| Dimethyl phthalate | 54 | |
| Ethylene glycol monobutyl ether | 124 | |
| Ethylene glycol monoethyl ether acetate | 68 | |
| Xylene | 75 | |

(1) As used in Example I.

The excellent intercoat adhesion and delamination resistance obtained when the above primer coating composition and the topcoat of Example I are applied to a metal substrate is believed to be due to the high level of fluorocarbon resin used in the primer.

The above examples illustrate the primer coating compositions of this invention and the excellent performance achieved by them in terms of the adhesion to a substrate and topcoat, as well as the corrosion resistance protection they provide.

What is claimed is:

1. A coating composition having a resin solids content of from about 15% to about 35% and being especially useful as a primer for substrates consisting essentially of, on a resins solids basis:
   (a) from about 10% to about 15% of a polyepoxide resin;
   (b) from about 30% to about 45% of a thermoplastic acrylic resin; and
   (c) from about 40% to about 55% of a fluorocarbon resin.

2. The composition of claim 1 additionally containing a pigment at a PVC of from about 3% to about 55%.

3. The composition of claim 2 wherein the fluorocarbon resin is a polyvinylidene fluoride resin.

4. The composition of claim 3 wherein the polyepoxide resin is a polyglycidyl ether of polyphenol.

5. The composition of claim 4 wherein the thermoplastic acrylic resin is polymerized ester derivatives of acrylic acid and methacrylic acid.

6. The composition of claim 5 wherein the thermoplastic acrylic resin is a copolymer of methylmethacrylate and ethylacrylate.

* * * * *